March 11, 1958   E. L. BLAKSLEE ET AL   2,826,525
METHOD OF APPLYING TAPE TO CAN BODY BLANKS
Filed May 4, 1956
Fig. 1
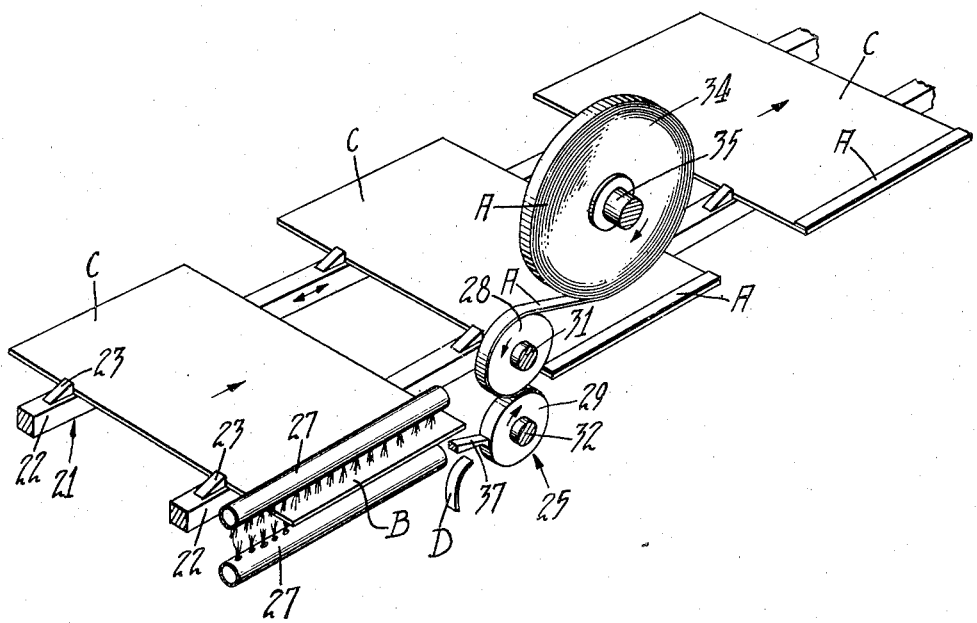
Fig. 2
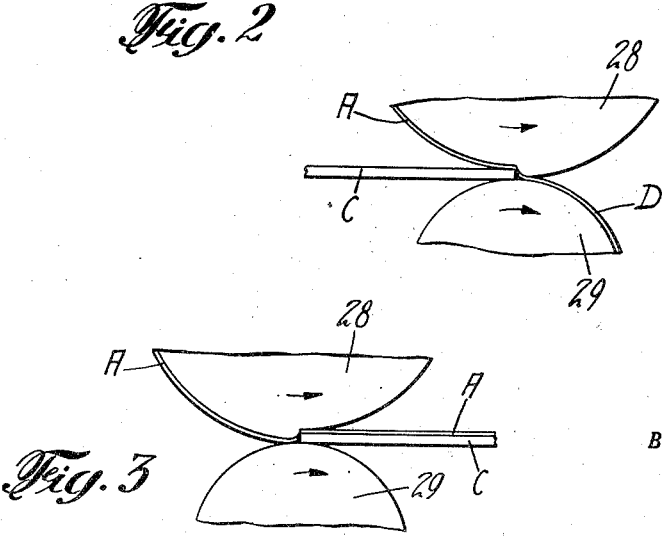
Fig. 3
INVENTORS
EDWARD L. BLAKSLEE
DONALD H. RUGE
BY Charles A. Erne
Leland R. McCann
George W. Reiber
ATTORNEYS

2,826,525

METHOD OF APPLYING TAPE TO CAN BODY BLANKS

Edward L. Blakslee, Lombard, and Donald H. Ruge, Crystal Lake, Ill., assignors to American Can Company, New York, N. Y., a corporation of New Jersey Application May 4, 1956, Serial No. 582,776

2 Claims. (Cl. 154—116)

The present invention relates to a method of applying tape to the side seam marginal edge portions of can body blanks for the manufacture of can bodies having solderless side seams and has particular reference to a method of feeding and cutting off the tape to fit the blanks.

An object of the invention is the provision of a method in which the tape may be applied directly to the blanks in the form of a continuous web such as from a reel or the like so as to eliminate precutting to length and subsequent separate handling of individual pieces of the tape.

Another object is the provision of such a method which permits of substantially continuous application of the tape to blanks moving along a path of travel in spaced processional order with the added feature of compensating for the spaces between the blanks.

Another object is the provision of such a method wherein the defining edges of the blank may be utilized to cut off excess portions of the tape.

Another object is the provision of such a method wherein application of the tape and cut off may be effected simultaneously or in timed order as desired.

Another object is the provision of such a method which is exceedingly simple and effective and which may be carried out in various forms of simple devices.

Another object is the provision of such a method which is particularly useful in the application of substantially solid preformed tapes for example tapes made of natural or synthetic thermoplastic materials.

Numerous other objects and advantages of the invention will be apparent as it is better understood from the following description, which, taken in connection with the accompanying drawings, discloses a preferred embodiment thereof.

Referring to the drawings:

Figure 1 is a perspective view of one form of apparatus for carrying out the steps of the instant method invention, parts being broken away; and Figs. 2 and 3 are fragmentary schematic views of certain of the parts of the apparatus shown in the operation of cutting the tape.

As a preferred or exemplary embodiment of the instant method invention the drawings illustrate the application of a substantially continuous tape A, preferably of substantially solid preformed natural or synthetic thermoplastic material, to one side seam marginal edge portion B of a flat, rectangular sheet metal blank C made of tin plate, black iron or other suitable sheet material from which cans or containers having solderless side seams are subsequently made.

The tape A preferably is applied to the face of the blank C in a position covering the side seam marginal edge portion B and extending parallel with this edge from the leading edge to the trailing edge of the blank as shown in Fig. 1. Any excess tape extending beyond the leading edge and the trailing edge is cut off. The cut off is effected by squeezing, pinching or otherwise exerting a pressure on the tape A at the leading and trailing edges of the blank so as to cause the edge of the blank to cut through the tape and thereby free the excess portions of the tape from the blank. To facilitate this cutting off operation the blank edges preferably are preheated. The temperature required depends upon the character of the tape. For a thermoplastic tape it has been found that a temperature of 450° F. to 500° F. is sufficient to give satisfactory results.

To effect this application of the tape to the blank and to cut off the excess tape, the blank may be moved relative to the tape or the tape relative to the blank. Also these steps may be effected on single positioned blanks or on blanks moving in processional order.

One form of apparatus, principal parts of which are shown in the drawings, for effecting these steps comprises in part a conveyor 21, preferably a pair of spaced and parallel reciprocable feed bars 22 having spring held feed dogs 23 carried thereon for engaging behind a plurality of blanks C and for propelling them along a predetermined straight line path of travel through an applying station 25. The blanks C are propelled in processional order with their side seam marginal edge portions B positioned adjacent the applying station side of the conveyor 21 and in end-to-end alignment as shown in Fig. 1.

While the blanks C are advanced by the conveyor 21, their side seam marginal edge portions B preferably are subjected to a heat treatment which raises the temperature of the portions B to between 450° F. and 500° F. For this purpose the apparatus is provided with heating elements, preferably electric or gas flame heating elements 27 disposed above and below the path of travel of the marginal edge portion B of the blanks so that these portion B pass between the heating elements during advancement of the blanks.

Immediately upon leaving the heating elements 27 the marginal edge portion B of a blank C passes through the applying station 25 to receive the tape A. At this station the marginal edge portion B of the blank passes between an upper or tape applying pressure roller 28 and a lower or backing-up roller 29. These rollers 28, 29 are mounted on respective shafts 31, 32 which are rotated in any suitable manner. The upper or applying pressure roller 28 carries the tape A in a substantially continuous web received from a reel 34 of such tape supported on a pin or shaft 35.

The applying pressure roller 28 preferably is provided with a resilient outer periphery such as a rubber or other rseilient material ring or may be made entirely resilient if desired. The backing up roller 29 preferably is a relatively hard surfaced roller made of steel, aluminum or other relatively hard material. The outer peripheries of these rollers 28, 29 preferably are in contact so as to hold the tape A between them and in engagement around a portion of the applying pressure roller 28 as shown in Fig. 1.

When a blank A moves into and passes through the applying station 25 the leading edge of the blank enters between the backing up roller 29 and the tape A one the applying pressure roller 28 as shown in Fig. 2 and thus causes the resilient outer periphery of the upper roller 28 to pinch or squeeze the tape against the leading edge of the blank with a force or pressure sufficient to cause the edge of the blank to cut through the tape and thereby free any portion of the tape that may extend from the blank beyond its leading edge. There is usually such a portion of tape in the space between two adjacent blanks C advancing in processional order. This cut off portion of tape (marked D) clings to the hard surface backing up roller 29 and is discarded by a scraper 37 (Fig. 1) which bears against the periphery of the roller.

The heated condition of the blank edge facilitates this cutting off action.

As the blank C continues to pass between the rollers 28, 29 the upper or applying pressure roller 28 lays or positions the tape A onto the side seam marginal edge portion B starting with the leading edge of the blank, and presses it tightly against the blank as shown in Fig. 1. Adhesion of the tape to the blank may be effected in any suitable manner. For tapes made of thermoplastic materials this adhesion may be effected by the heat in the blank. For tapes of other materials a suitable pressure sensitive or other adhesive applied to the tape may be used for this purpose.

At the trailing edge of the blank C, the resilient face of upper roller 28 rolls over the trailing edge as shown in Fig. 3 and thereby exerts sufficient force or pressure on the tape to cause the edge of the blank to cut through the tape, in the same manner as explained in connection with the leading edge, and thereby severs the applied portion of the tape from the continuous web engaging over the upper roller 28. Immediately upon severance of the tape at this trailing edge of the blank, the severed end of the tape on the upper roller 28 is caught between this roller and the lower roller 29 to retain the tape in position on the upper roller for the next incoming blank C for repeat applying and cutting off operations.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the process hereinbefore described being merely a preferred embodiment thereof.

I claim:

1. The method of applying tape to blanks, which comprises advancing a plurality of flat rectangular blanks in spaced processional order in a straight line path of travel, feeding a strip of tape in an oppositely curved path intersecting the path of travel of said marginal blank portions so that the leading blank edges engage against and pass along said tape to affix the tape to the adjacent blank surfaces during the advance of the blanks, and applying resilient rolling pressure to the blanks and tape while rigidly backing up said pressure during the application of the tape so that the leading and trailing blank edges are successively squeezed against the tape and thereby caused to sever the latter to render the affixed tape coextensive with said blank marginal portions with no non-affixed tape portions overhanging therefrom.

2. The method of applying tape to blanks, which comprises advancing a plurality of flat rectangular sheet metal blanks in spaced processional order in a straight line path of travel while heating the marginal blank portions at one side thereof coincident with said path, continuously feeding a strip of thermoplastic tape in an oppositely curved path vertically intersecting the path of travel of said heated marginal blank portions so that the leading heated blank edges engage against and pass along said tape to affix the tape to the adjacent upper heated blank surfaces during the advance of the blanks, and applying resilient rolling pressure to the blanks and tape while rigidly backing up said pressure during the application of the tape so that the heated leading and trailing blank edges are successively squeezed against the thermoplastic tape and thereby caused to soften and sever the latter to render the affixed tape coextensive with the margins of said blanks with no non-affixed tape portions projecting therefrom.

References Cited in the file of this patent

UNITED STATES PATENTS

| 1,173,426 | Herman | Feb. 29, 1916 |
| 2,538,520 | Holt et al. | Jan. 16, 1951 |